United States Patent [19]

Chung et al.

[11] Patent Number: 4,554,315

[45] Date of Patent: Nov. 19, 1985

[54] THERMOPLASTIC RESINOUS BLEND AND A METHOD FOR ITS PREPARATION

[75] Inventors: James Y. J. Chung, Wexford, Pa.; Russell P. Carter, Jr., New Martinsville, W. Va.; Dieter Neuray, Pittsburgh, Pa.

[73] Assignee: Mobay Chemical Corporation, Pittsburgh, Pa.

[21] Appl. No.: 651,145

[22] Filed: Sep. 17, 1984

[51] Int. Cl.$^4$ ............................................. C08L 69/00
[52] U.S. Cl. ........................................ 525/67; 525/74
[58] Field of Search .................... 525/67, 74, 69, 146, 525/148

[56]  References Cited

U.S. PATENT DOCUMENTS

| 3,130,177 | 4/1964 | Grabowski | 260/45.5 |
| 3,162,695 | 12/1964 | Grabowski | 260/873 |
| 3,761,440 | 9/1973 | Margotte et al. | 260/37 PC |
| 3,808,180 | 4/1974 | Owens | 260/885 |
| 3,852,393 | 12/1974 | Furukawa et al. | 260/873 |
| 3,864,428 | 2/1975 | Nakamura et al. | 525/67 |
| 4,022,748 | 5/1977 | Schlichting et al. | 260/40 R |
| 4,096,202 | 6/1978 | Farnham et al. | 260/873 |
| 4,264,487 | 4/1981 | Fromuth et al. | 525/67 |
| 4,444,950 | 4/1984 | Sakano et al. | 525/74 |

FOREIGN PATENT DOCUMENTS 1253226 11/1971 United Kingdom .

OTHER PUBLICATIONS

Chemical Abstracts, vol. 91, 1979, p. 36 91:40371g.

Primary Examiner—Theodore E. Pertilla
Attorney, Agent, or Firm—Gene Harsh; L. S. Pope; Aron Preis

[57] ABSTRACT

A thermoplastic blend comprising a $C_1$–$C_4$ (alkylene terephthalate), a polycarbonate resin and a butadiene or an acrylate based graft copolymer was found to be amenable without pre-extrusion drying, to thermoplastic processing upon the admixing therewith an additive amount of a polymeric modifier.

10 Claims, No Drawings

THERMOPLASTIC RESINOUS BLEND AND A METHOD FOR ITS PREPARATION

FIELD OF THE INVENTION

The present invention relates to a blend of thermoplastic polymer resins and to a method for its preparation.

SUMMARY OF THE INVENTION

A thermoplastic blend comprising a $C_1$-$C_4$ (alkylene terephthalate), a polycarbonate resin and a certain butadiene or acrylate based graft copolymer was found to be amenable without pre-extrusion drying, to thermoplastic processing upon the admixing therewith an additive amount of a polymeric modifier.

BACKGROUND OF THE INVENTION

Blends of ABS and polycarbonate resins were disclosed in U.S. Pat. Nos. 3,130,177 and 3,852,393 and although found suitable for many end uses, their impact resistance presented a drawback for some important markets. Similar blends are disclosed in British Pat. No. 1,253,226 whereas U.S. Pat. No. 3,162,695 is noted for its teaching respecting a blend of polycarbonate and a graft copolymer of methylmethacrylate and styrene monomers polymerized in the presence of a butadiene styrene latex.

Further noted is U.S. Pat. No. 3,864,428 wherein taught are compositions comprising an aromatic polyester, a polycarbonate and a graft copolymer of butadiene. Acrylate based graft copolymers of the type entailed in the present invention are known. U.S. Pat. Nos. 3,808,180, 4,096,202 and 4,022,748 disclose acrylate based graft copolymers suitable in the present context yet none describe the present invention or suggest the presently disclosed advantages. Further noted is U.S. Pat. No. 3,761,440 which discloses that a compound corresponding to the present modifier serves in stabilizing pigmented polycarbonate compositions.

In accordance with Chem. Abstract 91:40371g, thermoplastic polyester compositions containing glass fiber reinforcement, poly(tetramethylene terephthalate) and a blend of diene rubber based polymer and glycidyl compound polymer, exhibiting an improved warping resistance have been disclosed in Jpn. Kokai Tokkyo Koho 79 23,565.

The efficacy of the presently claimed polymeric modifier in promoting the level of the mechanical properties of the blends of the present invention and in particular the impact strength of these blends have not at all been suggested - see for instance column 1, lines 67-71 of said U.S. Pat. No. 3,761,440, where the indication is that the notched impact strength of the pigmented polycarbonates, stabilized in accordance with that invention remains fully preserved.

DETAILED DESCRIPTION OF THE INVENTION

1. Thermoplastic Polyester Resins (TPE)

The high molecular weight, thermoplastic polyester resins suitable in the practice of the invention are derived from an aromatic dicarboxylic acid and a diol component and are characterized in that their intrinsic viscosity is at least 0.4 deciliters per gram. Optionally, the aromatic dicarboxylic acid component accounts for at least 85 mole percent of the dicarboxylic acid component. Among the suitable aromatic dicarboxylic acids are terephthalic acid, isophthalic acid, naphthalenedicarboxylic acid, diphenyletherdicarboxylic acid, diphenyldicarboxylic acid, diphenylsulfone dicarboxylic acid and diphenoxyethane dicarboxylic acid. The optional, at most 15 mole percent of the acid component which is not aromatic dicarboxylic, may be represented by hydroxycarboxylic acids and by aliphatic dicarboxylic acids such as succinic acid, adipic acid and sebacic acid.

The diol component of these polyesters may contain from 2 to 10 carbon atoms, preferably from 2 to 4 carbon atoms in the form of linear methylene chains with up to 30 mole percent of one or more other aliphatic diols having from 3 to 8 carbon atoms, cycloaliphatic diols having from 6 to 15 carbon atoms or aromatic diols having from 6 to 21 carbon atoms. Examples of such additional diols ("codiols") include 3-methylpentanediol-(2,4), 2-methylpentanediol-(1,4), 2,2,4-trimethylpentane-2,2,4-trimethylpentanediol-(1,3), hexanediol-(1,3), 1,4-di-($\beta$-hydroxyethoxy)-benzene, 2,2-bis-(4-hydroxycyclohexyl)-propane, 2,4-dihydroxy1,1,3,3-tetramethyl-cyclobutane, 2,2-bis-(3-$\beta$-hydroxyethoxyphenyl)-propane and 2,2-bis-(4-hydroxy-propoxyphenyl)-propane.

Typical examples of the diol include polymethylene-$\alpha,\omega$-diols such as ethylene glycol, trimethylene glycol, tetramethylene glycol and hexamethylene glycol, neopentyl glycol, cyclohexane dimethylol, tricyclodecane dimethylol, 2,2-bis(4-$\beta$-hydroxyethoxyphenyl)-propane, 4,4'-bis-($\beta$-hydroxyethoxy)diphenylsulfone, and diethylene glycol.

The polyesters may be branched by incorporating trihydric or tetrahydric alcohols or tribasic or tetrabasic acids, as described in German Offenlegungsschrift No. 1,900,270 and U.S. Pat. No. 3,692,744. Examples of suitable branching agents include trimesic acid, pyromellitic acid, trimethylolpropane and ethane, and pentaerythritol. It is advisable not to use more than 1 mole % of branching agent, based on the quantity of acid component. The polyesters may also contain known monofunctional compounds such as phenol or benzoic acid as chain terminators.

The preferred polyesters are characterized in that their structure comprises units of the general formula (I):

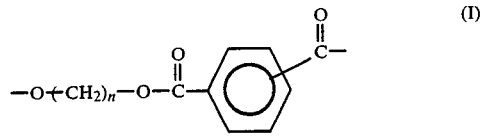

where n denotes 2 to 4.

The most preferred poly(alkylene terephthalate) in the present context is poly(ethylene terephthalate). The intrinsic viscosity characterizing the suitable polyester resins in the practice according to the invention should preferably be in the range of 0.4 to 1.4 grams per deciliter and, more preferably, between 0.5 and 1.2 grams per deciliter, as measured in a 1% solution in phenol and tetrachloroethane (60:40) at 25° C.

Methods for the preparation of the polyester resin suitable in the present context are known and have been described in U.S. Pat. Nos. 2,465,319 and 3,047,539.

The composition of the invention may include crystallization rate promoters for the polyester such as to allow lower mold temperatures and shorter injection cycles. Suitable promoters have been taught in U.S. Pat. No. 4,223,113 which disclosure is incorporated herein by reference.

2. The Polycarbonate Resins

The polycarbonate resins useful in the practice of the invention are homopolycarbonates, copolycarbonates and terpolycarbonates or mixtures thereof. The polycarbonates generally have molecular weights of 10,000–200,000 (weight average molecular weight), preferably 20,000–80,000 and have a melt flow rate per ASTM D-1238 at 300° C. of about 1 to about 24 gm/10 min., preferably about 2–12 gm/10 min. They may be prepared, for example, by the known diphasic interface process from phosgene and dihydroxy compounds by polycondensation (see German Offenlegungsschriften Nos. 2,063,050; 2,063,052; 1,570,703; 2,211,956; 2,211,957 and 2,248,817; French Pat. No. 1,561,518; and the monograph, H. Schnell, "Chemistry and Physics of Polycarbonates", Interscience Publishers, New York, 1964, all incorporated herein by reference).

In the present context, dihydroxy compounds suitable for the preparation of the polycarbonates of the invention conform to the structural formulae (1) or (2)

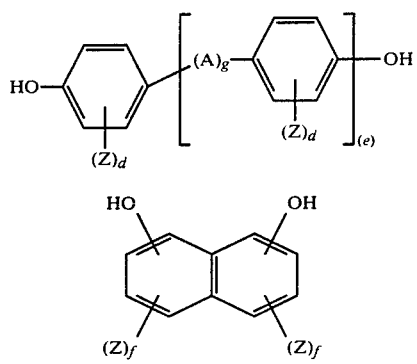

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen or sulfur atom, an —SO— or —SO$_2$— radical;

e and g both denote the number 0 or 1;

Z denotes F, Cl, Br or C$_1$-C$_4$-alkyl and if several Z radicals are substituents in one aryl Z radical, they may be identical or different;

d denotes 0 or an integer of from 1 to 4; and f denotes 0 or an integer of from 1 to 3;

Among the useful dihydroxy compounds in the practice of the invention are hydroquinone, resorcinol, bis-(hydroxyphenyl)alkanes, bis-(hydroxyphenyl)-cycloalkanes, bis-(hydroxyphenyl)-ethers, bis-(hydroxyphenyl)ketones, bis-(hydroxyphenyl)-sulfoxides, bis-(hydroxyphenyl)-sulfones and α,α-bis-(hydroxyphenyl)-diisopropylbenzenes, as well as their nuclear-alkylated compounds. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846, all incorporated herein by reference. Further examples of suitable dihydroxy compounds are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)sulfoxide, bis-(3,5-dimethyl-4-hydroxyphenyl)-sulfone, hydroxybenzophenone, 2,4-bis-(3,5-dimethyl-4-hydroxyphenyl)-2-methylbutane, 1,1-bis-(3,5-dimethyl-4-hydroxyphenyl)-cyclohexane, α,α-bis-(3,5-dimethyl-4-hydroxyphenyl)-p-diisopropyl benzene, and 4,4'-sulfonyl diphenol.

Examples of particularly preferred dihydroxy compounds are bisphenols such as 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable dihydroxy compounds.

Among the resins suitable in the practice of the invention are included phenolphthalein-based polycarbonates, copolycarbonates and terpolycarbonates such as are described in U.S. Pat. Nos. 3,036,036 and 4,210,741, both incorporated by reference herein.

The polycarbonates of the invention may also be branched by incorporating small quantities of polyhydroxyl compounds in them by condensation, e.g., 0.05–2.0 mole % (based on the quantity of bisphenols used). Polycarbonates of this type have been described, for example, in German Offenlegungsschriften Nos. 1,570,533; 2,116,974 and 2,113,347; British Pat. Nos. 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxyphenyl-4-isopropylphenol; 2,6-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4',4"-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above and which essentials are described below, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,248,414; 3,153,008; 3,215,668; 3,187,065; 2,064,974; 2,070,137; 2,991,273 and 2,000,835.

The preferred process is the interfacial polycondensation process.

According to the interfacial polycondensation process, copolycarbonate resins are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide or bis-chloroformic esters of the aromatic dihydroxy compounds. An organic solvent is provided in the reaction admixture which is a solvent for the polymer but not for the aromatic dihydroxy salts. Thus, chlorinated aliphatic hydrocarbons or chlorinated aromatic hydrocarbons are used as the organic solvent which dissolves the condensation product. In order to limit the molecular weight one may use monofunctional reactants such as monophenols, for example, the propyl-, isopropyl- and butylphenols, especially p-tert-butylphenol and phenol itself. In order to accelerate the reaction, catalysts such as tertiary amines, quaternary ammonium, phosphonium or arsonium salts and the like may be used. The reaction temperature should be about −20° C. to +150° C., preferably 0° to about 100° C.

According to the polycondensation process in a homogeneous phase, the dissolved reaction components are polycondensed in an inert solvent in the presence of an equivalent amount of a tertiary amine base required for absorption of the generated HCl such as, e.g., N,N-dimethylaniline, N,N-dimethyl-cyclohexylamine or, preferably, pyridine and the like. In still another process, a diaryl carbonate can be transesterified with the aromatic dihydroxy compounds to form the polycarbonate resin.

It is to be understood that it is possible to combine in the processes described above in a chemically meaningful way, both the aromatic dihydroxy compounds and the monohydroxy compounds in the form of the alkali metal salts and/or bis-haloformic acid esters and the amount of phosgene or carbonyl bromide then still required in order to obtain high molecular products. Other methods of synthesis in forming the polycarbonates of the invention such as disclosed in U.S. Pat. No. 3,912,688, incorporated herein by reference, may be used.

3. The Graft Polymers

The graft polymers suitable in the present context are characterized in that their structure comprises an elastomeric core based substantially on either a conjugated diene or an acrylate and a grafted phase. These polymers are known in the art and are characterized in that the glass transition temperature of the elastomeric phase is below about 0° C., and in that it is polymerized from butadiene or an acrylate or their respective copolymers. The elastomeric phase may optionally be at least partially crosslinked. The grafted phase comprises at least one monomer selected from acrylic esters of saturated aliphatic alcohols, methacrylic esters of saturated aliphatic alcohols, vinyl acetate, acrylonitrile, styrene and alkyl styrene.

Examples of the suitable grafts are MBS, i.e. methyl-methacrylate butadiene styrene resins and ABS, i.e. acrylonitrile butadiene styrene resins. Specifically, ABS grafts, described for example in U.S. Pat. No. 3,238,275 which is incorporated herein by reference, consist of two or more polymeric parts of different compositions chemically united. These graft copolymers may be prepared by polymerizing at least one conjugated diene, such as butadiene, or a conjugated diene with a monomer polymerizable therewith, such as styrene, to provide a backbone, with subsequent polymerization of at least one grafting monomer, and preferably two, in the presence of the prepolymerized backbone to complete the graft polymer.

The backbone, as mentioned, is preferably a conjugated diene polymer or copolymer such as polybutadiene, butadiene-styrene, butadiene-acrylonitrile or the like.

A specific conjugated diene monomer which may be utilized in preparing the backbone of the graft polymer is generically described by the formula:

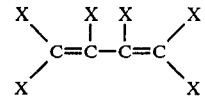

wherein X may be selected from the group consisting of hydrogen, alkyl groups containing from one to five carbon atoms, chloro and bromo. Examples of dienes that may be used are butadiene: isoprene; 1,2-heptadiene; methyl-1,3-pentadiene; 2,3-dimethyl-1,3-butadiene; 2-ethyl-1,3-pentadiene; 1,3- and 2,4-hexadienes, chloro- and bromo-substituted butadienes such as dichlorobutadiene, bromobutadiene, chloroprene, dibromobutadiene, mixtures thereof and the like. The preferred conjugated diene is butadiene.

The first monomer or group of monomers polymerized in the presence of the prepolymerized backbone are preferably monovinyl aromatic hydrocarbons. The monovinyl aromatic monomers utilized are generically described by the formula:

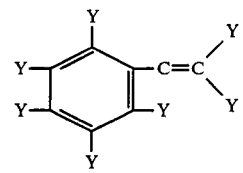

wherein Y may be selected from the group consisting of hydrogen, alkyl groups containing from one to five carbon atoms, chloro and bromo. Examples of the monovinyl aromatic compounds and substituted monovinyl aromatic compounds that may be used are styrene and other vinyl-substituted aromatic compounds including alkyl-, cycloalkyl-, aryl-, alkaryl-, aralkyl-, alkoxy-, aryloxy- and other substituted vinyl aromatic compounds. Examples of such compounds are 4-methyl-styrene, 3,5-diethyl-styrene and 4-n-propylstyrene, α-methylstyrene, α-methylvinyltoluene, α-chlorostyrene, vinyltoluene, α-bromostyrene, chlorophenylethylenes, dibromophenylethylenes, tetrachlorophenylethylenes, 1-vinylnaphthalene, 2-vinylnaphthalene, mixtures thereof and the like. The preferred monovinyl aromatic hydrocarbon is styrene and/or α-methylstyrene.

The second group of monomers that are polymerized in the presence of the prepolymerized backbone are acrylonitrile, substituted acrylonitrile and/or acrylic acid esters exemplified by acrylonitrile and alkyl acrylates such as methylmethacrylate. The acrylonitrile, substituted acrylonitrile or acrylic acid esters are described generically by the formula:

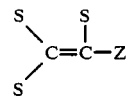

wherein S may be selected from the group consisting of hydrogen, alkyl groups containing from one to five carbon atoms, chloro and bromo and Z is selected from the group consisting of cyano and carbalkoxy wherein the alkyl group of the carbalkoxy group contains from one to about 12 carbon atoms. Examples of monomers of this description, i.e., acrylonitrile, substituted acrylonitrile or acrylic acid esters of the above formula are acrylonitrile, ethacrylonitrile, methacrylonitrile, α-chloroacrylonitrile, β-chloroacrylonitrile, α-bromoacrylonitrile and β-bromoacrylonitrile, methyl acrylate, methyl methacrylate, ethyl acrylate, butyl acrylate, propyl acrylate, isopropyl acrylate, isobutyl acrylate, mixtures thereof and the like. The preferred acrylic monomer is acrylonitrile and the preferred acrylic acid esters are ethyl acrylate and methyl methacrylate.

The preferred graft polymer of the invention, the conjugated diolefin polymer or copolymer is exemplified by 1,3-butadiene polymer or copolymer which comprises from about 40% by weight to about 85% by weight of the total graft polymer composition and the monomers polymerized in the presence of the backbone, exemplified by at least one of methyl methacrylate, ethyl acrylate, styrene and acrylonitrile comprise from about 60 to about 15% by weight of the total graft polymer composition.

A second class of suitable graft copolymers are those based on an acrylate of $C_1$–$C_{15}$ alcohol. These have been disclosed in U.S. Pat. Nos. 4,022,748, 3,808,180, 3,655,824 and 4,096,202, all incorporated by reference herein. Essentially, the grafts may be described as based on an acrylic rubber which comprises the polymerization product of an acrylate, i.e. prepolymer or core, which is then grafted with suitable systems forming a shell or a grafted phase. Among the suitable systems for forming the shell the following are advantageous: styrene and/or methacrylates and/or methacrylic or acrylic acid optionally with acrylonitrile or methacrylonitrile, optionally also with other monomers such as acrylates, vinyl esters, vinyl ethers, vinyl halides and vinyl substituted heterocyclic compounds such as vinyl pyrrolidone. Other acrylic based systems are described in the incorporated by reference U.S. Pat. No. 4,096,202. Briefly, the technology described in U.S. Pat. No. 4,096,202 is that of the preparation of a specific class of multi-phase compounds. These are compositions comprising about 25 to 95% by weight of a first elastomeric phase and about 75–5% by weight of a second, rigid, thermoplastic phase. The first phase is polymerized from about 75 to 99.8% by weight $C_1$ to $C_6$ acrylate resulting in an acrylic rubber core having a glass transition temperature below about 10° C. which is crosslinked with 0.1 to 5% by weight of a crosslinking monomer and to which is added 0.1 to 5% by weight of a graft-linking monomer.

The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include polyacrylic and polymethacrylic esters of polyols such as butylene diacrylate and dimethacrylate, trimethylol propane trimethacrylate and the like; di- and trivinyl benzene, vinyl acrylate and methacrylate, and the like. The preferred crosslinking monomer is butylene diacrylate. The graft-linking monomer is a polyethylenically unsaturated monomer having a plurality of addition polymerizable reactive groups, at least one of which polymerizing at a substantially different rate of polymerization from at least one other of said reactive groups. The function of the graft-linking monomer is to provide a residual level of unsaturation in the elastomeric phase, particularly in the latter stages of polymerization and consequently at or near the surface of the elastomer particles. The preferred graft-linking monomer is allyl methacrylate or diallyl maleate.

The final stage monomer system comprises at least one of alkyl methacrylate (preferably $C_1$–$C_{16}$ methacrylate), styrene, acrylonitrile, alkyl acrylates, dialkyl methacrylate, and the like, and is characterized in that the glass transition temperature of its polymerized form is at least 20° C. Preferably, the final stage monomer system is at least 50 weight % $C_1$ to $C_4$ alkyl methacrylate. It is further preferred that the final stage polymer be free of units which tend to degrade poly(alkylene terephthalate); for example, acid, hydroxyl amino and amide groups.

A certain such acrylic rubber interpolymer composite characterized in that acrylic rubber core is comprised of n-butyl acrylate and in that its crosslinking agent is 1,3-butylene diarylate and in which the graft-linking agent is diallyl maleate and the second phase monomeric system of which is methyl methacrylate, said components relating by weight to 79.2/0.4/0.4/20.0, is available in commerce as Acryloid KM330.

Such acrylic rubber based grafts suitable in the present context are available from a number of sources, e.g. Rohm & Haas Company, Philadelphia, U.S.A. under the trade designations Acryloid KM330 and 7709XP. Other useful polyacrylates are available from Goodyear Tire & Rubber Company, Akron, Ohio, U.S.A. under the trade designation RXL6886; from American Cyanamid Company, Stamford, Conn., U.S.A. under the trade designation Cyanacryl 770; from M & T Chemicals Company, Trenton, N.J., U.S.A. under the trade designation Durastrength 200; and from Polysar Corporation, Canada, under the trade designation Polysar S1006. In general, any of the polyalkyl acrylates described in U.S. Pat. No. 3,591,659, incorporated by reference herein, can be used, especially those containing units derived from n-butyl acrylate.

4. The Polymeric Modifier

The modifier in the present context is a polymer or a copolymer comprising a derivative of an olefinically unsaturated monomer carrying at least one epoxide group. Suitable polymers, including copolymers, of olefinically unsaturated monomers include those which contain nitrile and/or ester groups such as copolymers of acrylonitrile, methacrylonitrile, derivatives of acrylic or methacrylic acids such as esters of said acids and any of $C_1$–$C_6$ aliphatic or cycloaliphatic alcohols, especially $C_1$–$C_4$ aliphatic or cycloaliphatic alcohols; also included are alkenyl-aromatic compounds such as styrene and α-methylstyrene. Alkenyl aromatic compounds used as comonomers with the above-mentioned monomers are preferred.

The epoxide groups which characterize the modifier of the invention may be comonomers with vinyl monomers such as olefins, such as ethylene, propylene or isobutylene, aliphatic vinyl compounds such as vinyl chloride, vinylidene chloride, acrylic and methacrylic acid esters, amides and nitriles, vinyl acetate, vinyl propionate and vinyl benzoate, vinyl-methyl-ether, vinyl-ethyl-ether and vinyl-isobutyl-ether and aromatic vinyl compounds such as styrene, α-methyl styrene, vinyl toluene, p-ethylstyrene, 2,4-dimethyl styrene, o-chlorostyrene and 2,5-dichlorostyrene.

Suitable vinyl monomers containing epoxide groups are, for example, glycidyl esters of unsaturated carboxylic acids (glycidyl methacrylate), glycidyl ethers of unsaturated alcohols (allyl-glycidyl-ether) and of alkenylphenols (isopropenylphenyl-glycidylether), and vinyl and allyl esters of epoxycarboxylic acids (vinyl esters of epoxidized oleic acid). In general, all compounds which contain both a polymerizable unsaturated group and reactive epoxide groups in the molecule can be used for the manufacture of the modifier of the invention. Copolymers of 5-30% (by weight) of glycidyl methacrylate, 20-60% of methyl methacrylate and 20-60% of styrene are particularly suitable.

The copolymers containing epoxide groups may be obtained according to known processes, for example by radical polymerization in chlorobenzene at 80° C. in 50% strength solution. The molecular weight of these copolymers are between about 10,000 and about 200,000, preferably between about 30,000 and about 80,000, and they contain about 5 to about 500, preferably about 20 to about 200, epoxide groups per macromolecule.

For instance, the monomers such as listed above are dissolved in an appropriate solvent, such as benzene, chlorobenzene or toluene, and polymerized at a temperature of about 80° C. by adding azobisisobutyronitrile whereby oxygen is excluded.

After the monomers have been reacted, the solvent used is distilled off (e.g., chlorobenzene at 100° C. and 20 torr) and the residue is dried in vacuum at 100° C. and then powdered. The resulting powder is useful as additive in the process of the invention.

The resinous blend of the invention comprises about 10 to 80% of thermoplastic polyester, about 15 to 85% of a polycarbonate resin and about 5 to 30% of the graft polymer. Preferably, the blend comprises about 40 to 60 percent of a thermoplastic polyester, about 25 to 45 percent of a polycarbonate resin and about 10 to about 20 percent of the graft polymer. The recited percentages are in relation to the weight of the resinous blend. The modifier is added in accordance with the invention at a level of about 0.1 to about 15 parts per hundred weight of resinous blend (phr), preferably about 0.3 to about 5.0 phr.

The advantages offered by the present invention are seen in that by the addition of a relatively small amount of a modifier to the resinous blend, there is indicated no need to dry the blend, or its components, prior to extrusion as was customary hitherto. As is well recognized in the art, similar blends require a drying step prior to extrusion if the mechanical properties are to be preserved. Surprisingly, it has now been discovered that the addition of the presently disclosed modifier to these blends obviates the drying step, as is evidenced by the level of the mechanical properties of the compositions of the invention. The invention is therefore directed also to a process for the preparation of thermoplastic molding compositions which process entails extrusion, preferably by a vented extruder, which is characterized in that no drying is entailed prior to the extrusion step.

Naturally, the molding compositions of the invention may contain any of the additives and/or modifiers known in the art such as mold release agents, plasticizers, thermal and hydrolytic stabilizers, flame retarding and antioxidant agents, fillers and reinforcing agents as well as pigments, dyes and nucleating agents.

The invention is further illustrated, but is not intended to be limited by the following examples in which all parts and percentages are by weight unless otherwise specified.

EXAMPLES

EXAMPLE 1

Compositions in accordance with the invention were prepared and their properties determined. In the preparation of the compositions which are described below the components were as follows: Polycarbonate resin: a homopolycarbonate based on bisphenol-A (Merlon ® M-50 from Mobay Chemical Corporation) characterized in that its melt flow rate per ASTM D-1238 (300° C. -1200 g load) is about 3.0-5.9 gm/10 min.

ABS: characterized in that its butadiene (core) content is about 75% and in that its grafted phase is of styrene and acrylonitrile (S/AN=72/28% by weight).

Poly(ethylene terephthalate): Vituf 9501A from Goodyear Rubber & Chemical Company characterized in that its intrinsic viscosity is 0.95 (as determined in accordance with Goodyear Rubber & Chemical Company test method R-103B).

Modifier: a copolymer of styrene/methyl methacrylate/glycidyl methacrylate, characterized in that the ratio of the monomers is 60:20:20, respectively, and in that its molecular weight is about 30,000.

The compositions further contained small amounts of carbon black as a pigment, talc as a nucleator, a phosphite based thermal stabilizer and octadecyl 3-(3',5'-di-tert-butyl-4'-hydroxyphenyl) propionate as an antioxidant: these additives are considered to have no criticality in the present context.

The components were not dried prior to the blending (tumble blending for 10 minutes) nor prior to extrusion. Extrusion was carried out in 2" MPM vented extruder, 2.75/1 screw, screw speed 80 rpm, screen pack 20/40/60/20, vacuum 18, at a temperature profile (°C., rear to front): 260, 260, 260, 260, 260, clamp 255, die 255.

The extruded pellets were dried prior to injection molding (at about 110° C. for about 16 hours in a hot air circulating oven) and were then molded into test specimens using a 4 oz. Newbury molding machine. The injection molding conditions were as follows:

| Zone set temperature (°C.): | |
|---|---|
| rear | 260 |
| front | 260 |
| nozzle | 254 |
| mold surface | 70 |
| Melt temperature: | 260 |
| Cycle time (seconds): | |
| injection | 12 |
| cooling | 25 |
| total cycle | 37 |
| Injection pressure (psi): | |
| primary | 850 |
| secondary | 800 |

| | Example 1 | Control |
|---|---|---|
| Resinous components: | | |
| Poly(ethylene terephthalate), % | 51.0 | 51.0 |
| Polycarbonate resin, % | 34.0 | 34.0 |
| ABS, % | 15.0 | 15.0 |
| Modifier added, phr[1] | 0.5 | — |
| Mechanical properties | | |

-continued

|  | Example 1 | Control |
|---|---|---|
| Impact strength, notched Izod, ft.lb./in., (gate/end side) | | |
| $\frac{1}{8}''$ | 15.6/15.4 | 15.4/16.4 |
| $\frac{1}{4}''$ | 12.5/12.7 | 3.1/3.3 |
| After heat treatment[2] | | |
| $\frac{1}{8}''$ | 13.8/13.3 | 3.6/6.0 |
| $\frac{1}{4}''$ | 9.4/9.1 | 2.9/2.0 |
| Flexural strength, psi × $10^{-3}$ | 11.0 | 10.9 |
| Flexural modulus, psi × $10^{-5}$ | 2.94 | 2.88 |
| Tensile strength, psi × $10^{-3}$ | 7.25 | 7.12 |
| Elongation, % | 152 | 63 |

[1]phr - per hundred weight of resinous components
[2]heating at 130° C. for 30 min.

EXAMPLE 2

Further compositions in accordance with the invention were prepared and tested. The preparation method including the components and their relative amounts as well as the extrusion and injection molding step and testing entailed in the compositions below were identical to the ones described in Example 1 except that the poly(ethylene terephthalate) resin used presently was Tenite 6857, a product of Eastman Kodak Corporation. The resin is characterized in that its intrinsic viscosity is about 0.73 as measured in a 0.5% solution of (60%/40% by weight) phenol and tetrachloroethane at 25° C. The properties of the compositions were as follows:

|  | Example 2 | Control |
|---|---|---|
| Impact strength, notched Izod ft.lb./in. (gate/end side) | | |
| $\frac{1}{8}''$ | 14.0/14.7 | 9.5/12.8 |
| $\frac{1}{4}''$ | 3.3/3.3 | 2.3/2.3 |
| After heat treatment | | |
| $\frac{1}{8}''$ | 15.6/16.2 | 3.5/3.3 |
| $\frac{1}{4}''$ | 2.9/2.7 | 2.4/2.1 |

As may be readily appreciated, the compositions of the invention are in comparison to the controls, characterized by their improved level of impact strength (Izod, Notched) indicating beneficial and unexpected advantages.

The invention has been described with reference to specific materials yet is limited only as set forth in the accompanying claims.

What is claimed is:

1. A thermoplastic molding composition comprising
I. a blend of
   (i) about 10–80% of a thermoplastic polyester resin,
   (ii) about 15–85% of a polycarbonate resin,
   (iii) about 5–30% of a graft polymer which is characterized in that its core is substantially of a conjugated diene or of a $C_1$–$C_{15}$ acrylate, said core having a glass transition temperature below about 0° C. and which is further characterized in that its grafted phase comprises any of acrylic or methacrylic esters of saturated aliphatic alcohols, vinyl acetate, acrylonitrile, styrene and alkyl styrene and
II. about 0.1 to 15 parts per hundred weight of said blend of a polymer modifier comprising at least one derivative of an olefinically unsaturated monomer carrying at least one epoxide group.

2. The composition of claim 1 wherein said thermoplastic polyester is poly(ethylene terephthalate).

3. The composition of claim 1 wherein said graft polymer is an acrylonitrile, butadiene, styrene or methylmethacrylate, butadiene, styrene.

4. The composition of claim 1 wherein said polymeric modifier further comprises at least one of nitrile and ester groups.

5. The composition of claim 1 wherein said polymeric modifier is a copolymer of a vinyl monomer containing at least one epoxide group and at least one comonomer selected from the group consisting of olefins, aliphatic vinyl compounds, acrylic acid esters, methacrylic acid esters, amides, nitriles, vinyl acetate, vinyl propionate, vinyl benzoate, vinyl-methyl ether, vinyl-ethyl ether, vinyl isobutyl ether and aromatic vinyl compounds.

6. The composition of claim 5 wherein said vinyl monomer containing at least one epoxide group is a member selected from the group consisting of glycidyl esters of an unsaturated carboxylic acid, glycidyl ethers of unsaturated alcohols, glycidyl ethers of alkenylphenols, vinyl esters of epoxycarboxylic acids and allyl esters of epoxycarboxylic acids.

7. A thermoplastic molding composition comprising
I. a blend of
   (i) about 40–60% of poly(ethylene terephthalate),
   (ii) about 25–45% of a homopolycarbonate based on bisphenol-A,
   (iii) about 10–20% of an acrylonitrile, butadiene, styrene graft polymer which is characterized in that its butadiene content is about 40–85% of said polymer, and
II. about 0.3 to 5.0 phr of a polymeric modifier which structure comprises derivatives of styrene, methylmethacrylate and glycidyl methacrylate.

8. The molding composition of claim 7 wherein said derivatives relate by weight as about 60:20:20.

9. A process for preparing a thermoplastic molding composition comprising
I. blending without prior drying a mixture comprising
   (i) about 10–80% of a thermoplastic polyester resin,
   (ii) about 15–85% of a polycarbonate resin,
   (iii) about 5–30% of a graft polymer which is characterized in that its core is selected from the group consisting of acrylates, acrylate copolymers, butadienes and butadiene copolymers, said core having a glass transition temperature below about 0° C. and which is further characterized in that its grafted phase comprises any of acrylic or methacrylic esters of saturated aliphatic alcohols, vinyl acetate, acrylonitrile, styrene and alkyl styrene
and about 0.1 to 15 parts per hundred weight of said blend of a polymer modifier comprising at least one derivative of an olefinically unsaturated monomer carrying at least one epoxide group and
II. extruding without prior drying the blend obtained in accordance with said I.

10. A process for preparing a thermoplastic molding composition comprising
I. blending without prior drying a mixture comprising
   (i) about 40–60% of poly(ethylene terephthalate),
   (ii) about 25–45% of a homopolycarbonate based on bisphenol-A,
   (iii) about 10–20% of an acrylonitrile, butadiene, styrene graft polymer which is characterized in that its butadiene content is about 40–85% of said polymer, and
about 0.3 to 5.0 phr of a polymeric modifier which structure comprises derivatives of styrene, methylmethacrylate and glycidyl methacrylate and
II. extruding without prior drying the blend obtained in accordance with said I, said extrusion being carried out in a vented extruder.

* * * * *